March 4, 1930.                E. PALE                1,749,503
SANITARY GARBAGE AND REFUSE REMOVER
Filed March 29, 1926
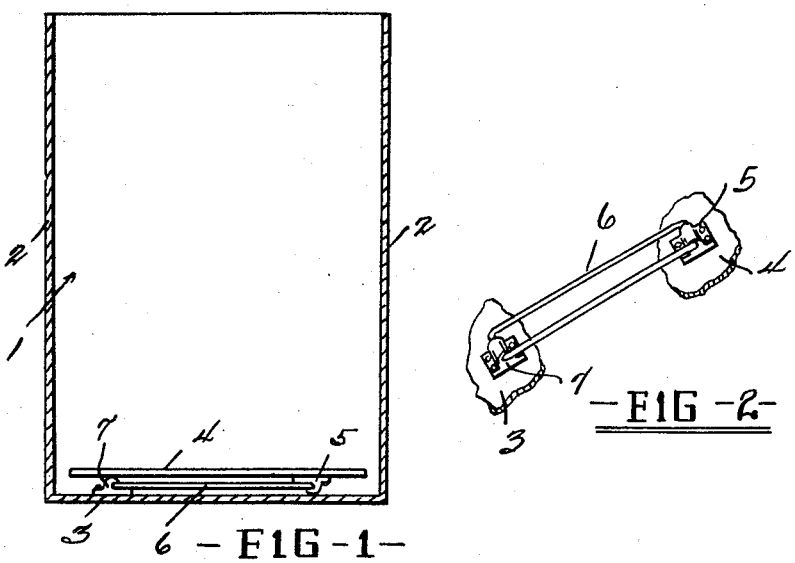
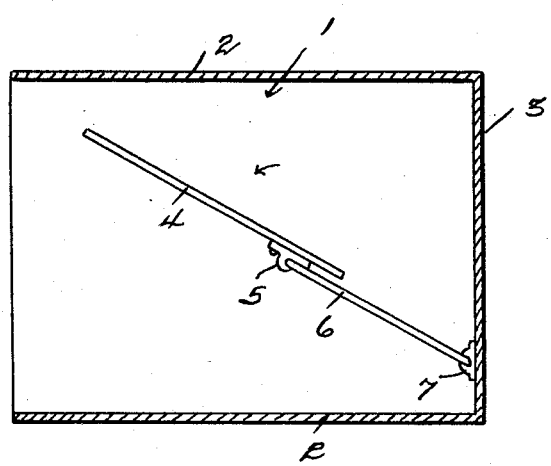
INVENTOR.
E. PALE,
BY Elwood H. Seal.
ATTORNEY.

Patented Mar. 4, 1930

1,749,503

UNITED STATES PATENT OFFICE

ELIAS PALE, OF SAN PEDRO, CALIFORNIA, ASSIGNOR OF ONE-HALF TO LLOYD S. NIX, OF LOS ANGELES, CALIFORNIA

SANITARY GARBAGE AND REFUSE REMOVER

Application filed March 29, 1926. Serial No. 98,288.

My present invention, in its broad aspect, has reference to scavenging devices for refuse and garbage receptacles and cans, whereby the contents thereof will be completely and thoroughly expelled from the receptacle or container for garbage, refuse, and the like, as soon as the receptacle or container is inverted and slightly shaken, thereby eliminating the necessity of pounding the receptacle or container or can on the side of the collection vehicle or the like, or using implements or the like, to complete the evacuation and cleansing of the receptacle or container of its contents. More particularly it is my purpose to arrange within the receptacle or container for garbage or the like a baffle or follower or false bottom of substantially the same size as the cross-sectional area of the container, and loosely held therewithin, so that when the container is inverted the weight of the baffle or follower will cause the contents to be expelled and will cleanse the sides of the container of any articles or objects which might adhere thereto. It is also my object to so mount the baffle or follower that it will gradually assume a position cross-wise of the container as it follows the contents out thereby assisting in expelling the contents toward one side of the container.

Other and equally important objects of my invention may be briefly defined as follows: first, my invention is formed of but two major parts; i. e. baffle and rod; and these parts may be used with any size or shape of container it merely being necessary to change the size and shape of the baffle and rod; second, all parts can be readily and cheaply manufactured at relatively small cost, and will add but little to the price of the container when sold with my device installed; third, my device adds but little to the weight of the container, and fourth, containers for garbage and the like with my device installed are less liable to be dented and broken up, and can be kept clean and sanitary at all times.

While in the foregoing there has been illustrated and described such combination and arrangement of elements as constitute the preferred embodiments of my invention, it is nevertheless desired to emphasize again the fact that interpretation should only be conclusive when made in the light of the claims appended hereunto and forming a part of this specification.

In the drawings wherein is illustrated the preferred embodiment of my invention:—

Figure 1 is a sectional side view of a container with my device applied and the container in its usual upright position, and Figure 2 is a sectional view of a container in the dumping position.

Figure 3 is a detailed, perspective view of my baffle or follower and rod per se.

In the drawings wherein like characters of reference are used throughout the several views to designate like or similar parts:—

The numeral (1) designates a container, can or receptacle for trash, refuse, garbage, or the like, and which has sides (2) and a bottom (3). The container may be of any suitable size or shape. Within the container and resting on the bottom (3) thereof is a baffle or follower plate (4) of substantially the same size, shape and area as the cross-sectional area of the container and which may be formed of sheet metal or the like and fits loosely within the container. Pivotally connected to the underside of the baffle or follower as at (5) is a rod (6), the other end of which is pivotally connected as at (7) to the upper side of the bottom (3) of the container (1) and adjacent one side thereof, so that when the baffle or follower rests on the bottom the rod will lie folded up or flat on the bottom. When the receptacle is in the position shown in Figure 1 the baffle or follower lies on the bottom and the receptacle is adapted to be filled. When it is desired to empty the same it is inverted and the baffle or follower pushes the trash and garbage or other contents before it. Furthermore as the trash is evacuated the sides of the receptacle are scraped clean and since the positions of the pivots of the rod (6) are off-set with respect to each other the motion of the baffle will be slightly sweeping so that it assumes the position shown in Figure 2 when the receptacle is evacuated. Having emptied the container or receptacle it is returned to the upright position shown in Figure 1 and the baffle drops to the bottom, the rod (6) folding down under it.

While it is believed that the operation and construction of my device will be apparent to one skilled in the art from the foregoing description taken in connection with the accompanying drawings, attention is called to the simplicity and unique arrangement and operation of the parts thereof to the end that a garbage can will be kept in a sanitary condition at all times. Attention is also called to the fact that but a slight shake or jar is necessary to evacuate the contents whereas heretofore it has been necessary to pound the container or receptacle hard against the collecting vehicle; in fact, reinforced receptacles have been in demand on the market for just this reason. Emphasis is again laid upon the fact that interpretation of the invention should be conclusive only with respect to the scope of the claims.

I claim:—

1. In combination with a container or receptacle, a scavenging device comprising a follower of substantially the shape and area of the inner cross-section of the container or receptacle, and a rod pivoted to the bottom of the receptacle or container and to the follower to fold down upon the bottom in one position to dispose the follower on the bottom, and to swing out in another position to permit movement of the follower lengthwise of the container or receptacle.

2. In combination with a container or receptacle, a scavenging device comprising a follower, and a rod pivoted to the bottom of the receptacle or container and adjacent one side, and to the follower on its under side and adjacent one edge thereof, to fold down upon the bottom in one position to dispose the follower on the bottom, and to swing out in another position to permit movement of the follower lengthwise of the container or receptacle.

3. In a device of the character described, the combination of a container or receptacle for garbage or the like, and a scavenging device therefor comprising a follower of substantially the same size and shape as the interior cross-sectional area of the receptacle or container and adapted to lie crosswise of the receptacle adjacent its bottom, and folding means connecting the follower with the bottom of the receptacle to permit the same to move toward the mouth of the receptacle to expel its contents when the receptacle is inverted or substantially inverted.

E. PALE.